No. 790,424. PATENTED MAY 23, 1905.
W. BRUNS.
TRANSMITTING AND REVERSING GEAR FOR MOTORS.
APPLICATION FILED SEPT. 24, 1904.

Witnesses:

Inventor:
William Bruns

No. 790,424. Patented May 23, 1905.

UNITED STATES PATENT OFFICE.

WILLIAM BRUNS, OF NEW YORK, N. Y.

TRANSMITTING AND REVERSING GEAR FOR MOTORS.

SPECIFICATION forming part of Letters Patent No. 790,424, dated May 23, 1905.

Application filed September 24, 1904. Serial No. 225,738.

*To all whom it may concern:*

Be it known that I, WILLIAM BRUNS, a citizen of Germany, residing at New York city, (Brooklyn,) county of Kings, and State of New York, have invented new and useful Improvements in Transmitting and Reversing Gear for Motors, of which the following is a specification.

This invention relates to a gear-transmission for imparting a greater or less speed in either direction to a work-shaft from a power-shaft which is rotatable at uniform speed in one direction only.

The invention is particularly designed to transmit power from an explosive-engine to the propeller-shaft of a boat or to the crank-shaft of a locomotive.

Figure 1:
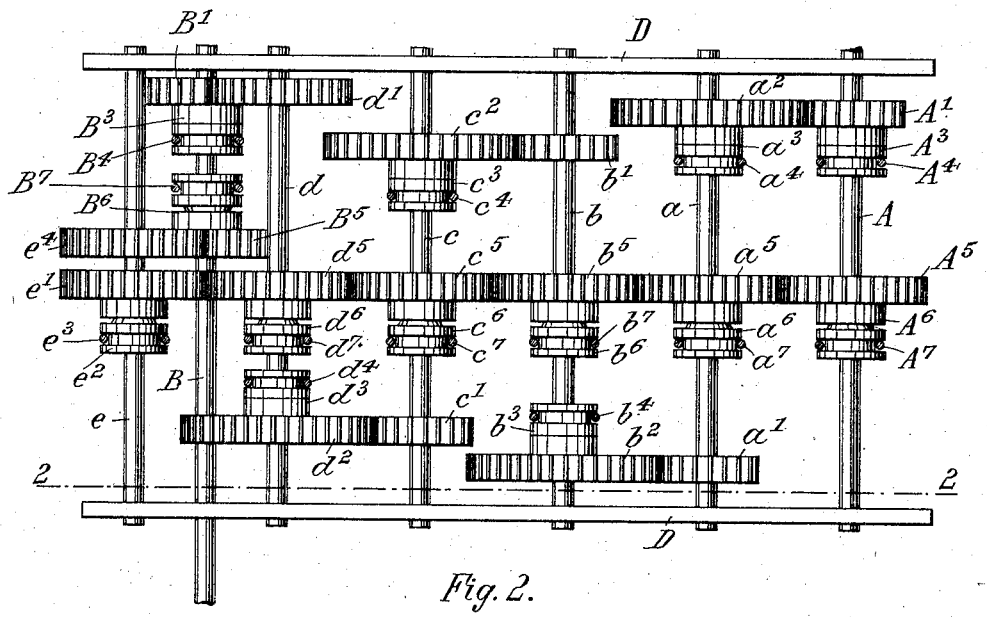
Figure 2:
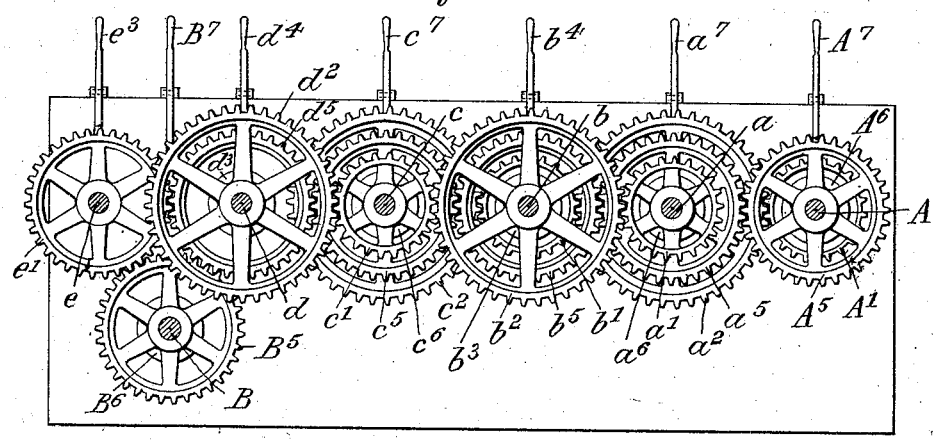

In the accompanying drawings, Figure 1 is a plan of my improved transmitting and reversing gear, showing it laid out in a plane; Fig. 2, a section on line 2 2, Fig. 1, with some of the clutches omitted; and Fig. 3, a diagram of the gear, showing the preferred grouping of the shafts.

The letter A represents the power-shaft of an explosive-engine, which can be rotated at uniform speed and in one direction only.

B is a work-shaft, such as the propeller-shaft of a boat, which is to be driven from shaft A at variable speed and in different directions.

In order to transmit power in the manner desired from shaft A to shaft B, I interpose between such shafts a series of counter-shafts $a\ b\ c\ d$ and a reversing-shaft $e$. These shafts are journaled in the frame D, that supports the shafts A B. Each of the shafts A $a\ b\ c$ is coupled to its succeeding shaft by a speed-reducing gear and in addition thereto by a uniform-speed-transmitting gear, the construction being such that either of the gears may be coupled or uncoupled while the machine is in motion. The speed-reducing gear consists of small gear wheels or pinions A' $a'\ b'\ c'$, mounted on opposite ends of shafts A $a\ b\ c$, respectively. Of these pinions the pinion A' may be coupled to its shaft A by a clutch $A^3$, manipulated by clutch-lever $A^4$, while the pinions $a'\ b'\ c'$ are fast on their respective shafts. The pinion A' engages a large gear-wheel $a^2$, which may be coupled to shaft $a$ by clutch $a^3$, operated by clutch-lever $a^4$. In like manner pinions $a'\ b'\ c'$ engage, respectively, large gear-wheels $b^2\ c^2\ d^2$, adapted to be coupled to their shafts $b\ c\ d$ by clutches $b^3\ c^3\ d^3$, operated by levers $b^4\ c^4\ d^4$. The shaft $d$ carries a fast gear-wheel $d'$, meshing into an equally-sized gear-wheel B', which may be coupled to shaft B by a clutch $B^3$, operated by lever $B^4$.

In order to transmit the full speed of shaft A to shaft B, the shafts A $a\ b\ c\ d$ carry intermeshing gear-wheels $A^5\ a^5\ b^5\ c^5\ d^5$. These wheels are all of like diameter and are adapted to be coupled to their respective shafts by clutches $A^6\ a^6\ b^6\ c^6\ d^6$, operated by levers $A^7\ a^7\ b^7\ c^7\ d^7$. The wheel $d^5$ of shaft $d$ engages a gear-wheel $e'$ of reversing-shaft $e$, which may be coupled thereto by clutch $e^2$, operated by lever $e^3$. The reversing-shaft $e$ further carries a fast gear-wheel $e^4$, meshing into a gear-wheel $B^5$, that may be coupled to shaft B by clutch $B^6$, operated by lever $B^7$.

The operation will be readily understood. If the shaft B is to be driven at the lowest speed, all the clutches $A^3\ a^3\ b^3\ c^3\ d^3\ B^3$ are closed, while the clutches $A^6\ a^6\ b^6\ c^6\ d^6$ are opened. In this way power is transmitted through the reducing-gears A' $a^2\ a'\ b^2\ b'\ c^2\ c'\ d^2\ d'$ B'. If the shaft B is to be driven at its maximum speed, all the clutches $A^3\ a^3\ b^3\ c^3\ d^3$ are opened, while the clutches $A^6\ a^6\ b^6\ c^6\ d^6\ B^3$ are closed. In this way power is transmitted through the uniform-speed gear $A^5\ a^5\ b^5\ c^5\ d^5\ d'$ B'. If the shaft B is to be reversed, the clutch $B^3$ is opened, while the clutches $e^2\ B^6$ are closed. In this way motion is transmitted in a reverse direction from shaft $d$ through wheels $d^5\ e'\ e^4\ B^5$ to shaft B. Between the two speed limits various intermediate speeds may be imparted to shaft B by uncoupling either one or more sets of reducing-gears A' $a^2$, $a'\ b^2$, &c., and coupling the corresponding sets of the uniform-speed gears $A^5\ a^5$, $a^5\ b^5$, &c.

Figure 3:
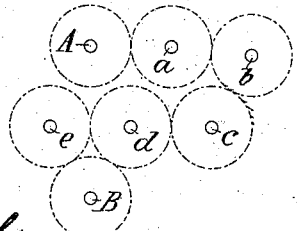

As shown in Fig. 3, I prefer to so arrange the shafts that the work-shaft B is placed vertically below the power-shaft A, while the counter-shafts and the reversing-shaft are grouped in proximity to the shafts A B.

What I claim is—

1. In a transmitting and reversing gear for motors, a power-shaft and work-shaft, combined with a series of counter-shafts, a first set of fast and loose reducing gear-wheels, a second set of loose uniform gear-wheels mounted on the shafts, and means for coupling the loose gear-wheels to the shafts, substantially as specified.

2. In a transmitting and reversing gear for motors, a power-shaft and work-shaft, combined with a series of counter-shafts, a first set of fast and loose reducing gear-wheels, a second set of loose uniform gear-wheels mounted on the shafts, means for coupling the loose gear-wheels to the shafts, a reversing-shaft, and means for coupling said shaft to one of the counter-shafts and to the work-shaft, substantially as specified.

Signed by me at New York city, (Manhattan,) New York, this 23d day of September, 1904.

WILLIAM BRUNS.

Witnesses:
 FRANK V. BRIESEN,
 FRED UNFRICHT.